Dec. 30, 1930.       G. L. MOORE       1,787,257

METHOD OF MAKING LUBRICANT RECEIVING FITTINGS

Original Filed April 13, 1927

Inventor
George L. Moore
By Williams Bradbury, McCaleb & Hinkle
Attys.

Patented Dec. 30, 1930

1,787,257

UNITED STATES PATENT OFFICE

GEORGE L. MOORE, OF CHICAGO, ILLINOIS, ASSIGNOR TO ALEMITE CORPORATION, OF CHICAGO, ILLINOIS, A CORPORATION OF DELAWARE

METHOD OF MAKING LUBRICANT-RECEIVING FITTINGS

Original application filed April 13, 1927, Serial No. 183,441. Divided and this application filed March 2, 1929. Serial No. 344,080.

The present invention relates to a method of making lubricant receiving fittings of the type which are adapted to be fixed into a bearing structure, and which are provided with a bayonet joint for connection to a grease gun. The chief object of the invention is to provide a method by which these fittings can be more easily and cheaply manufactured than those at present in use. Other objects will appear from the following description, and the accompanying drawings.

This application is a division of my copending application, Serial No. 183,441, filed April 13, 1927, in which I claim the nipple per se.

Figure 1:
Fig. 1 shows the cross sectional form of a special shape of stock which I have designed for the purposes of this invention.
Figure 2:
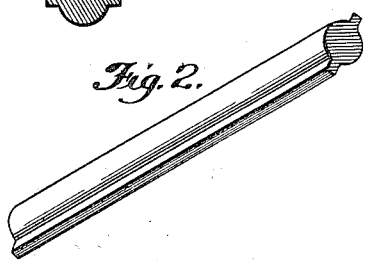
Fig. 2 shows a bar of the stock in perspective.

The stock for these fittings or nipples has a cross section in the form of a circle with two projecting ribs, as shown in Figs. 1 and 2. This is a form which may readily be extruded or rolled and would normally be cut into lengths suitable for use in an automatic screw machine. The stock might be made with only a single rib, or it might be made with more than two ribs, but the majority of grease guns have two bayonet slots in the end connection, and the form having two ribs is shown for that reason.

Figure 3:
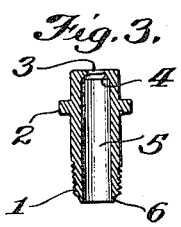
Fig. 3 shows a longitudinal sectional view of the piece forming the body of one of the nipples.

The preferred form of nipple has a body member formed as indicated in Fig. 3, and comprises the screw thread 1 by means of which it may be attached to the bearing member, the lugs 2 which form the means for attaching the nipple to a grease gun, the opening 3 through which the grease or oil is to enter, the valve seat 4 against which the check valve is to seat, the bore 5 through which the lubricant is forced to the bearing and which is to contain the check valve and the spring, and the skirt 6 which is to be bent over to retain the spring and check valve in position.

Figure 4:
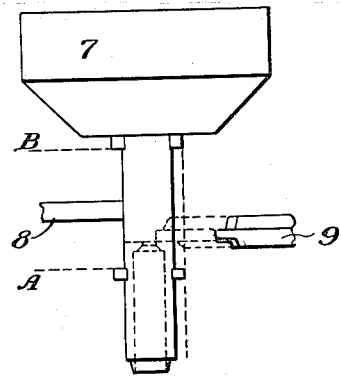
Fig. 4 illustrates diagrammatically the manner in which these nipples are turned from the bar of stock.

The method of forming the body members from stock is indicated in Fig. 4, in which the chuck of an automatic screw machine is shown at 7, a turning tool of conventional type is shown at 8, and a forming and cutting-off tool is shown at 9.

The diameter of the circular position of the stock is the same as the diameter of the finished nipple, so that there is no machining operation on the main outside diameter except to turn off the ribs where they are not required to form the lugs. This turning may be done by the tool 8, moving from A to B, or it may be done by a tool having a width equal to the length from A to B, without longitudinal travel.

At the same screw machine operation in which the ribs are turned off, the bores 3 and 5 are drilled, the thread 1 is cut by a die of well-known form, not shown, and the skirt 6 is formed by the cutting-off tool as it cuts off the body member. It will be seen from the above that this nipple may be formed, together with the bayonet lugs, at a single operation on an automatic screw machine.

It will be noted that as the nipples come from the automatic, the lugs are left square. While this form is satisfactory, and in certain cases preferable, there are conditions which require that the lugs should be of circular cross section, and I have provided a means and method as indicated in Fig. 5 by which the lugs may be rounded if desired.

Figure 5:
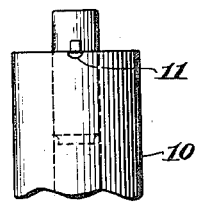
Fig. 5 shows a forming die for rounding the pins which are to engage the bayonet joint on the grease gun.

In Fig. 5 a die is indicated at 10. This die is bored to receive the nipples, and a channel 11 of semicircular cross section is provided to receive the lugs. This channel has a cross sectional radius the same as that of the finished size of the rounded lug. The punch 12 is also bored the same size as the diameter of the nipple, and has a channel 13 similar to the channel 11, to cooperate therewith in forming the lug. By simply striking the punch against the die the operation of rounding and forming the lug is completed. It will be understood of course that the punch and die might be formed to receive the nipple sideways, and that the punch and die operating means may be of any of the forms which are known to the art.

Figure 6:
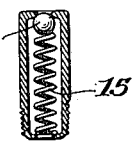
Fig. 6 shows a longitudinal sectional view of one of the nipples with the ball check valve and spring in place.
Figure 7:
Figs. 7 and 8 show the finished nipple in elevation.
Figure 8:
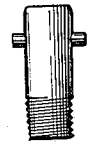

Fig. 6 shows the usual check valve 14 yieldably held in closed position by the spring 15. It will be understood that a specific form of the check valve is not a part of this invention and that it may be varied if desired. The means of retaining the spring, however, is important, for the lugs are made integral with the body member, and they do not project inside the bore 5 to form a support for the spring, as would be the case if the bayonet lugs were provided by a pin passing through the bore 5 to form a support for the spring and projecting on each side of the body member. The spring support is provided by forming a thin skirt on the lower end of the nipple, and turning this skirt over in a die, after the insertion of the ball and spring to project into the bore and retain the spring in compressed position against the check valve.

By this method of retaining the spring the defects of certain former constructions are avoided, there being no pin projecting into the bore through a joint with the walls which would be likely to leak, and there being no rough chips left inside the bore which would be likely to break off and find their way into the bearing.

It will be obvious that this invention is susceptible of various embodiments and accordingly I do not wish to limit myself except as set forth in the following claims.

I claim:

1. The method of making nipples of the type having a substantially cylindrical body and having radially extending lugs projecting from the cylindrical surface thereof, which comprises rolling long rods having a cross section in the form of a circle separated into two arcs by substantially radial projections which extend outwardly from the circular portion for a distance sufficient to provide the length of the lugs, and turning off the projections in a lathe except at the point where the lugs are desired, thereby leaving lugs of substantially rectangular cross section, and striking the lugs in a round die to reduce their cross section to circular form.

2. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, and providing the blank with a longitudinal bore.

3. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, providing the blank with a longitudinal bore, and forming a spring abutment in said bore.

4. The method of making a nipple-shaped grease cup, which consists in forming a one-piece bar of indeterminate length, including a substantially cylindrical body portion and longitudinally extending wings integral with the body portion and projecting from opposite side portions thereof, transversely severing said bar to form a blank for a single cup, removing portions of the wings from the blank to leave bayonet-joint studs on the body portion, screw-threading an end portion of the blank, providing the blank with a longitudinal bore, and inwardly displacing portions of the metal forming the bore, to provide spurs constituting a spring abutment.

5. The method of making a nipple-shaped grease cup and bayonet joint studs thereon, which consists in first making a solid metal blank having material in excess of that required for the body of the cup, displacing the excess metal to form the external surface of the cup body and cause the displaced metal to protrude from opposite side portions thereof, forming bayonet joint studs from the displaced metal, and longitudinally boring the blank to form a grease cavity.

In witness whereof, I hereunto subscribe my name this 26 day of Feb., 1929.

GEORGE L. MOORE.